Figure 1:
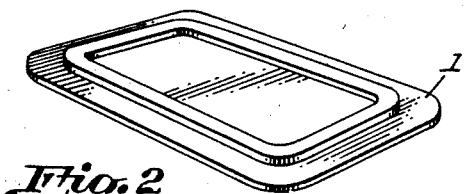

Jan. 12, 1943.　　　　J. W. SIMMONS　　　　2,308,030
HOPPER FRONT BOX
Original Filed Feb. 23, 1939　　2 Sheets-Sheet 1

Inventor.
JOHN W. SIMMONS.
By Fay Macklin, Gohrich
Williams, Chilton and Deler
Attorneys.

Jan. 12, 1943.   J. W. SIMMONS   2,308,030
HOPPER FRONT BOX
Original Filed Feb. 23, 1939   2 Sheets-Sheet 2
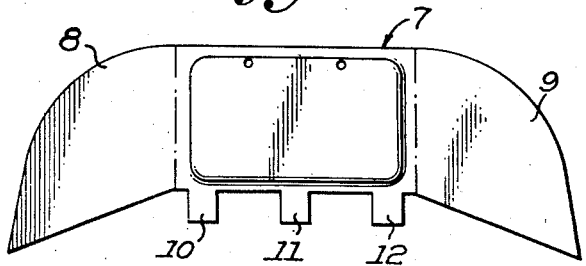
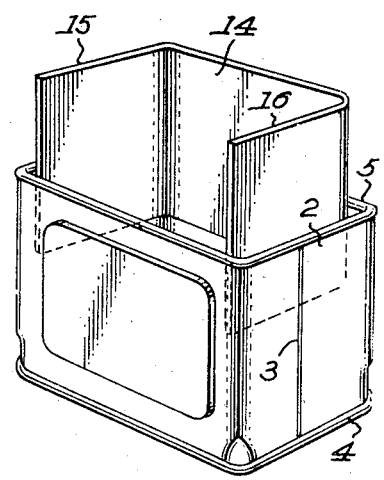
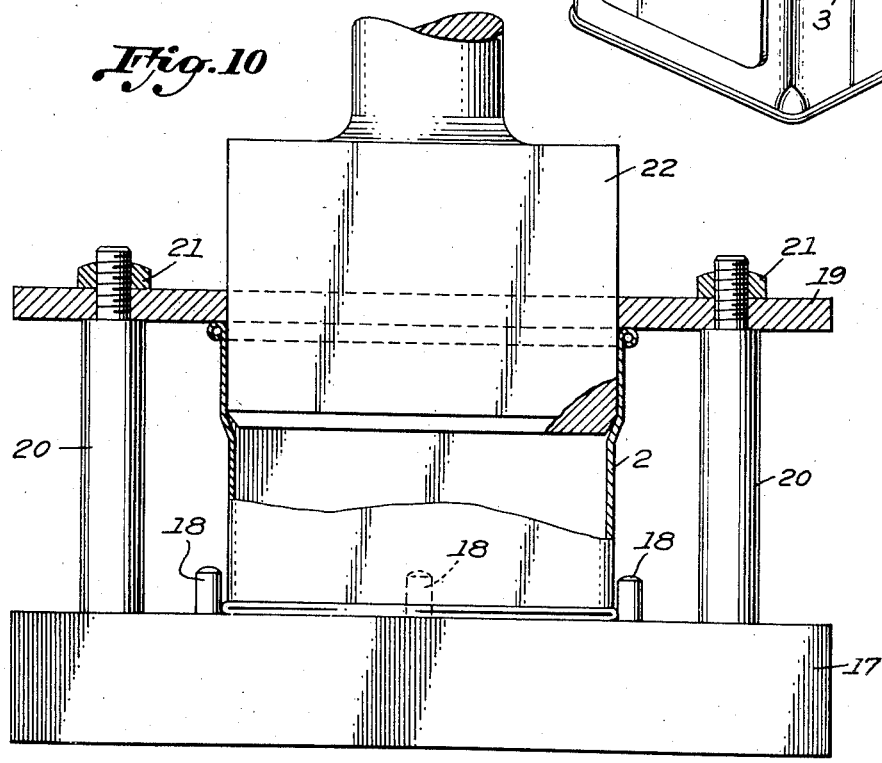
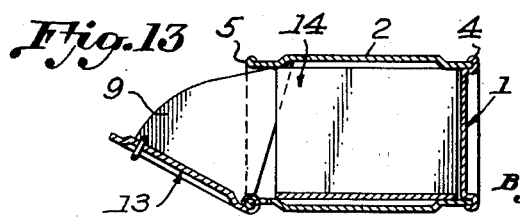
Inventor.
JOHN W. SIMMONS
By Fay, Macklin, Golrick
Williams, Whilton and Isler
Attorneys.

Patented Jan. 12, 1943

2,308,030

UNITED STATES PATENT OFFICE 2,308,030

HOPPER FRONT BOX

John W. Simmons, Cleveland Heights, Ohio

Original application February 23, 1939, Serial No. 257,843. Divided and this application October 24, 1939, Serial No. 300,989

2 Claims. (Cl. 220—32)

This invention relates to a container which is preferably formed of metal and to a method of making and assembling the same.

The usual and customary method of manufacturing boxes of this type is to stamp and form the blanks into the proper shape by a series of blanking and forming dies and then to assemble the blanks so formed manually and weld the various parts together. The assembled unit is then sprayed or painted and baked.

The disadvantage of the method referred to is the slowness of production made necessary because of the fact that the parts have to be manually assembled and welded together. Another disadvantage of such method is that it is impossible as a practical matter to weld surfaces that have been finished or which have a coating applied thereto such as lithographing, printed and lacquered coatings.

The type of box to which this invention relates is known to the trade as a "hopper front box" which has a door which is hingedly mounted on the front of the box and is so shaped as to provide a hopper disposed in front of the box when the door is opened. Such boxes are made in such a manner that when a number of boxes are stacked one on top of another, the contents of each box is accessible without disturbing the others.

According to my method of manufacturing and assembling boxes, I am able to take full advantage of modern automatic and semi-automatic machines which are old and well known and are now used in the production of cans, thereby greatly reducing the cost of the tools and dies necessary.

One object of my invention is to provide a box of the character described which can be made and assembled with a small number of operations and with a minimum cost for the tools and dies necessary to make the box.

Another object of my invention is to provide a box which is open at one end and has mounted thereon a hopper-like door which neatly fits the open end of the box and which is provided with a liner which is loosely mounted in the box and so disposed that it cooperates with the opposite side walls of the box to define a pair of narrow compartments which receive therein the flanges which form the side walls of the hopper-like door.

According to my method of making and assembling the different parts of the box, the bottom of the box is generally rectangular in shape and has oval or rounded corners. The side walls of the box are also generally oval in shape and have an overturned bead or curl at the upper edge thereof to reinforce the same. In order to properly close the box and to have a neat fit, it is necessary that the upper or open end of the box be made rectangular in shape and with square corners so that the hopper-like door will properly fit the same. I make use of a suitable tool which squares up the interior of the upper end of the box so as to obtain a proper fit between the door and the box.

A further object of the invention is to provide a box of the character described which contains a minimum number of parts and a method of assembling such parts in such a manner that the number of tools or dies required is reduced to a minimum, thereby greatly decreasing the cost of production of such boxes.

Figure 2:
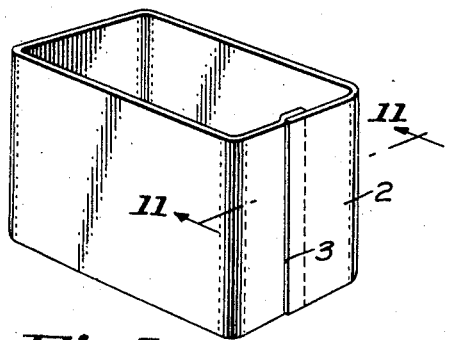
Figure 3:
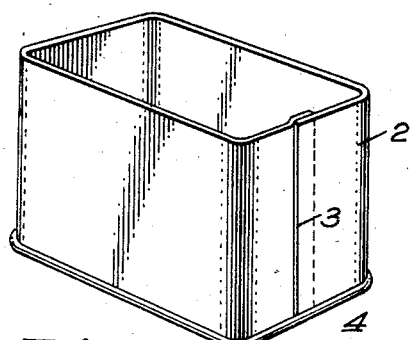
Figure 4:
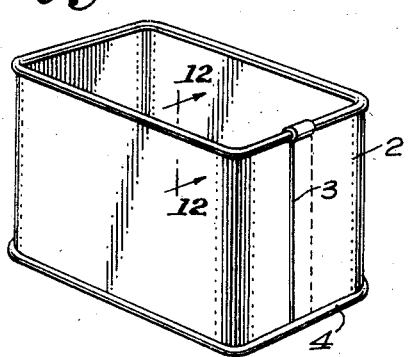
Figure 5:
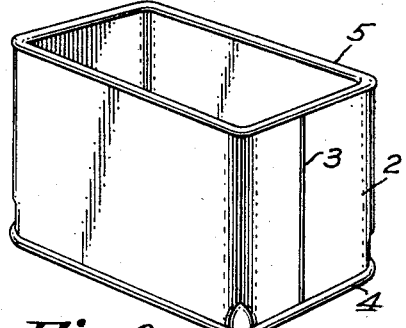
Figure 6:
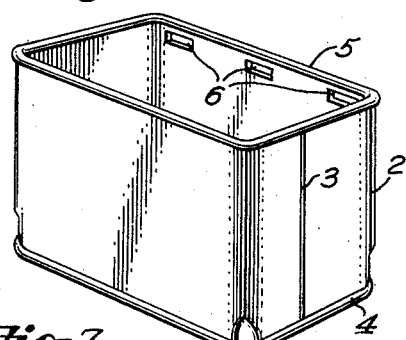
Figure 7:
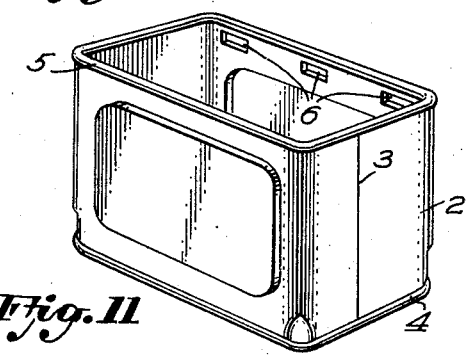
Figure 11:
Figure 12:

Further and more limited objects of the invention will appear as the description proceeds and by reference to the accompanying drawings in which the several steps of making and assembling the box are disclosed. Fig. 1 is a perspective view showing the bottom of the box after it has been blanked and formed; Fig. 2 is a perspective view showing the boxed side walls; Fig. 3 is a perspective view showing the boxed side walls having the bottom secured thereto; Fig. 4 is a perspective view of the box showing the curled edge or bead formed at the open upper end thereof; Fig. 5 is a perspective view showing the box as it will appear after having the upper end thereof squared; Fig. 6 is a perspective view of the box after the openings have been formed therein along one edge to permit the hopper-like door to be secured thereto; Fig. 7 is a perspective view of the box after the side walls have been embossed; Fig. 8 is a plan view of the hopper-like door after it has been blanked; Fig. 9 is a view showing the liner partially inserted into the box; Fig. 10 is a view showing the punch or tool for squaring up the upper end of the box; Fig. 11 is a sectional view on the line 11—11 of Fig. 2; Fig. 12 is a sectional view on the line 12—12 of Fig. 4; and Fig. 13 is a sectional view of the finished box.

Referring now to the drawings, the reference character 1 designates the base or bottom of the box after it has been formed. The side walls 2 of the box are formed from a single piece of metal the edges of which are folded over and interlocked with each other as shown at 3. The bottom of the box is secured to the side walls by having the edges thereof turned over to form a bead indicated by the reference character 4. The upper edges of the side walls of the box have a bead or curl 5 formed thereon which serves to strengthen and to increase the rigidity of the box. A plurality of openings 6 which are rectangular in shape are formed adjacent the upper edge of one of the side walls.

The hopper-like door is formed from a single piece of metal and is made from a blank 7 which is of the shape shown in Fig. 8. The blank has a pair of flanges 8 and 9 and a plurality of projecting portions 10, 11 and 12 which serve to provide a hinge for the door in a manner to be hereinafter described. The side flanges are bent outwardly and form a door indicated generally by the reference character 13. To secure the door to the box the projections 10, 11 and 12 are inserted into the opening 6 and bent downwardly so as to provide a pivotal mounting therefor. Disposed within the box and preferably loosely arranged therein is a liner 14 which preferably consists of a single piece of metal or other suitable material bent to the shape shown in Fig. 9 and inserted into the box. The side walls 15 and 16 of the liner cooperate with the adjacent side walls of the box and provide a pair of compartments which receive therein the flanges 8 and 9. The flanges 8 and 9 are of such shape that they afford stops for limiting the outward movement of the door.

As the door must be substantially rectangular in shape, it is necessary that the upper end of the box be shaped or formed so as to obtain a neat fit. It is therefore necessary to square up the upper end of the box. An apparatus for performing this operation is illustrated in Fig. 10 and consists essentially of a base plate 17 which has thereon a plurality of positioning pins 18. Disposed above the base plate 17 is a stripper plate 19 which is spaced therefrom by suitable spacing members 20. The stripper plate is held in place by nuts 21. The reference character 22 designates a punch the lower end of which is square or rectangular in shape and is slightly smaller than the upper end of the finished box. In order to square up the box, the box is placed on the base plate in the position shown in Fig. 10 and the punch is forced into the upper end of the box which results in squaring up the upper end of the box so that the corners thereof are at substantially right angles. This operation, of course, is performed before the hopper-like door is secured in place.

In making and assembling the box, I prefer to proceed as follows, although some variation may be made in the order of steps: The first step is to form the bottom 1 of the box from a piece of flat stock which has been previously coated, finished or lithographed. The next step is to form the sides of the box from a similar piece of material by passing it through an automatic forming machine where it is formed, shaped and seamed. The adjacent edges of the side walls of the box are secured together by interlocking the complementary portions of the seams with each other and then flattening the same to hold them in place.

The next step is to assemble the base and body or side walls of the box which produces the structure shown in Fig. 3. This operation is performed in a suitable machine particularly designed for this purpose.

The next operation is to curl over or form a bead on the upper open end of the side walls of the box which operation is also performed in a suitable machine designed for that purpose. This curl or bead strengthens the box and serves also to provide a suitable hinge for the hopper-like door.

The next step is to square up the upper end of the box. This operation is performed with the apparatus hereinbefore described and illustrated in Fig. 10. The depth to which the punch 22 is inserted into the box may be varied as desired, it being necessary that only the extreme upper portion of the side walls be squared up.

The next step is to punch the slots or holes 6 in the side walls of the box although this operation may be performed before the upper edge of the box is curled over, if desired.

The next step is that of embossing either two or four sides of the body of the box in such a manner that all or a part of the side walls of the box is pressed out in such a way that it is disposed in a plane parallel with the curled-over ends of the side walls. This enables a plurality of such boxes to be stacked one on another. The method of assembling and mounting the door and liner has already been described.

One of the features of my method of forming and assembling the various parts of the box resides in the enormous saving effected in die and tool costs. I am able to make use of standard base sizes which are a standard article of manufacture thereby making it unnecessary to use different size bases. If a larger box is needed, the side walls may be made higher using the same size base and the same size door. It will therefore be seen that I can use the same size base and at very little additional cost produce a wide range in sizes or boxes. With about six size bases I can produce between fifty and seventy-five different size boxes without any additional expense for tools or dies.

It will now be clear that I have provided a box method of making and assembling the same which will accomplish the objects of the invention as hereinbefore stated. The method can be performed on regular can making machines which will accomplish the objects of the inven- and which therefore can utilize lithographed or embossed sheets in a manner similar to that used in manufacturing and decorating an ordinary lithographed can. When the box has reached a certain stage of production, the edge of the open end thereof is curled over to form a bead which strengthens the container and also serves as a part of the hinge. The box may then be re-formed and embossed in special machines. The resulting container is square or rectangular in shape and is of very rigid construction.

It will of course be understood that various changes may be made in the details of construction and order of steps of the method of assembly without departing from the spirit of my invention and that the embodiment of the invention herein disclosed is to be considered merely as illustrative and not in a limiting sense, as the invention is limited only in accordance with the scope of the appended claims. It is contemplated that the body portion of the box, or in fact, the entire box may be formed of paper, fibre, plastic or the like or it may have a metal base and a metal bead secured to the open upper end if desired.

This application is a division of my co-pending application Serial No. 257,843, filed February 23, 1939, for Container and method of making same, now matured into Patent No. 2,231,032.

Having thus described my invention, what I claim is:

1. A substantially rectangular metal box comprising top, bottom and side walls having an open end, and an oppositely disposed closed end, a hopper-like door pivotally secured to the edge of the bottom wall of said box and movable to a position to close the same, said door constituting one end wall of the box and having a pair of oppositely disposed side flanges which extend into said box along the side walls, a one-piece, open-ended, U-shaped flexible liner loosely disposed within said box with the sides of the U extending along the side walls of the box and substantially coextensively therewith, said liner being held in place by the contents of the box and the frictional contact of the liner with the walls of the box, said liner being positioned inwardly of said flanges and cooperating with the opposite side walls of the box to define a pair of narrow compartments to receive said flanges.

2. A substantially rectangular metal box comprising top, bottom and side walls and having an open end, and an oppositely disposed closed end, a hopper-like door pivotally secured to the edge of the bottom wall of said box and movable to a position to close the same, said door constituting one end wall of the box and having a pair of oppositely disposed side flanges which extend into said box along the side walls, a one-piece, open-ended, U-shaped flexible liner loosely disposed within said box with the sides of the U extending along the side walls of the box and substantially coextensive therewith, said liner being held in place by the contents of the box and the frictional contact of the liner with the walls of the box, said liner being positioned inwardly of said flanges and co-operating with the opposite side walls of the box to define a pair of narrow compartments to receive said flanges, an outwardly extending bead surrounding the said open end of the box, and the bottom and top walls of the box being embossed outwardly so that the exterior surfaces thereof lie in substantially the same plane as the edge of said bead, to facilitate stacking of the boxes.

JOHN W. SIMMONS.